United States Patent [19]

Olander

[11] 4,184,034
[45] Jan. 15, 1980

[54] MANGANESE BENZOIN-IMINE CATALYSTS AND PROCESS OF PREPARING POLYPHENYLENE ETHERS USING SAID COMPOUNDS AS CATALYSTS

[75] Inventor: Walter K. Olander, Mt. Vernon, Ind.

[73] Assignee: General Electric Company, Pittsfield, Mass.

[21] Appl. No.: 872,439

[22] Filed: Jan. 26, 1978

[51] Int. Cl.$^2$ ............................................. C08G 65/44
[52] U.S. Cl. .............................. 528/215; 260/429 J; 528/212; 528/216; 528/217
[58] Field of Search ............ 260/429 J; 528/212, 528/215, 217, 216

[56] References Cited

U.S. PATENT DOCUMENTS

| | | | |
|---|---|---|---|
| 3,220,979 | 11/1965 | McNelis | 528/212 |
| 3,306,874 | 2/1967 | Hay | 528/212 |
| 3,306,875 | 2/1967 | Hay | 528/212 |
| 3,388,141 | 6/1968 | Berenbaum | 260/429 J |
| 3,444,133 | 5/1969 | Behr et al. | 528/212 |
| 3,455,880 | 7/1969 | Kobayashi et al. | 528/212 |
| 3,573,257 | 3/1971 | Nakashio et al. | 528/212 |
| 3,787,361 | 1/1974 | Nakashio et al. | 528/212 |
| 3,956,242 | 5/1976 | Olander | 528/212 |
| 4,093,596 | 6/1978 | Olander | 528/215 |
| 4,093,597 | 6/1978 | Olander | 528/215 |
| 4,093,598 | 6/1978 | Banucci et al. | 528/215 |

Primary Examiner—Lester L. Lee
Attorney, Agent, or Firm—Morgan, Finnegan, Pine, Foley & Lee

[57] ABSTRACT

A novel catalyst is disclosed that is useful in the oxidative coupling of phenolic monomers. The catalyst is a manganese chelate derived from a benzoin-imine.

This invention relates to a new and novel catalyst that is useful for catalyzing the oxidative coupling of a phenolic monomer. The catalyst is a manganese chelate derived from a benzoin-imine.

13 Claims, No Drawings

MANGANESE BENZOIN-IMINE CATALYSTS AND PROCESS OF PREPARING POLYPHENYLENE ETHERS USING SAID COMPOUNDS AS CATALYSTS

BACKGROUND OF THE INVENTION

The polyphenylene oxides and methods for their preparation are known in the art and are described in numerous publications, including Hay U.S. Pat. Nos. 3,306,874 and 3,306,875. The Hay processes are based on the use of copper-amine complex catalysts. Manganese based catalysts for the oxidative coupling of phenolic monomers in the formation of polyphenylene oxides are disclosed in McNelis, U.S. Pat. No. 3,220,979; Nakashio, U.S. Pat. No. 3,573,257; Nakashio, U.S. Pat. No. 3,787,361 and Olander, U.S. Pat. No. 3,956,242. In the applicant's copending applications Ser. No. 491,475 filed July 24, 1974 and Ser. No. 534,903 filed Dec. 20, 1974, there are disclosed novel procedures for polymerizing polyphenylene oxides with complex manganese based catalysts. All of these patents and applications are hereby incorporated by reference.

In U.S. Pat. Nos. 3,444,133 and 3,455,880, there are disclosed manganese chelates of bis-salicylaldehyde ethylene diimine which are reported to be useful in the preparation of polyphenylene oxides. Japanese printed patent applications 26396/73 and 26398/73 also disclose catalysts which may be manganese or cobalt complexes of one or more compounds selected from the group consisting of primary amines and aliphatic, alicyclic and aromatic aldehydes. None of these citations discloses a manganese chelate derived from a benzoin-imine or suggest its use in the oxidative coupling of phenolic monomers under basic conditions.

Accordingly, it is a primary object of this invention to provide a novel manganese catalyst for the oxidative coupling of phenolic monomers.

DETAILED DESCRIPTION OF THE INVENTION

The present invention provides novel catalysts for the oxidative coupling of phenolic monomers. The novel catalysts are compounds of the formulae:

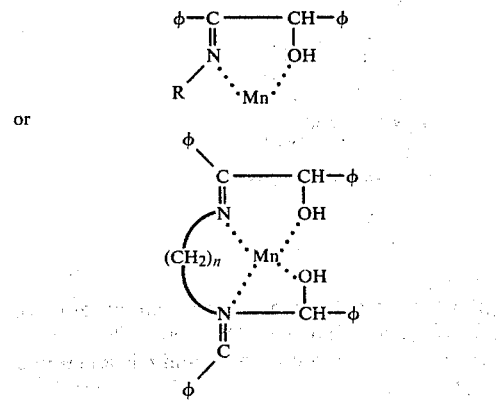

wherein R is selected from hydrogen, amino, anilino, alkyl, aminoalkyl and hydroxyalkyl, said alkyl group containing from 1 to 8 carbon atoms; and n is an integer from 2 to 3.

Included within the scope of formula I are compounds wherein R is methyl (benzoin methylimine manganese); R is n-hexyl (benzoin n-hexylimine manganese); R is anilino (benzoin anilinoimine manganese); and R is hydroxyethyl (benzoin hydroxyethylimine manganese).

Illustrative of catalysts having formula II is the compound wherein n is 2 (bis-benzoin ethylenediimine manganese).

The imine component of the novel catalysts disclosed herein can be prepared by reacting benzoin with a compound of the formula $R-NH_2$ or $NH_2-(CH_2)_n-NH_2$ wherein R and n are as defined above in accordance with the following reaction schemes:

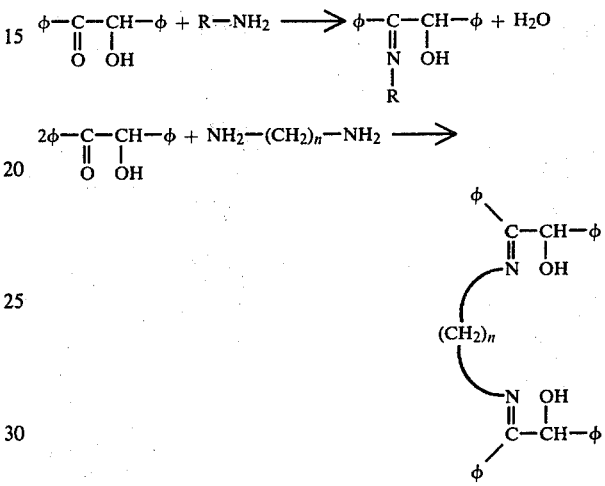

wherein $\phi$ is phenyl and R and n are as defined above.

Generally, the imine can be prepared by heating benzoin with an amino containing compound of the formulae $R-NH_2$ or $NH_2-(CH_2)_n-NH_2$ wherein R and n are as defined earlier in an appropriate solvent such as benzene or a lower alkanol of 1-6 carbon atoms, e.g. methanol. If desired the manganese salt may be added after the imine is prepared or the manganese salt, benzoin and the amino containing compound may all be combined to form the manganese benzoin imine chelate in a single step.

Generally, one usually employs substantially stoichiometric amounts of the reagents in preparing the manganese imine benzoin chelate. However, it is normally preferred to add at least slight excess amounts of amino containing compound and mangenese salt in order to ensure substantially complete formation of the chelate compound.

It should be noted that if the catalyst to be prepared falls within the scope of compounds having formula I, stoichiometric equivalent amounts of benzoin and $R-NH_2$, the amino containing compound are equimolar. For catalysts of formula II, the stoichiometric equivalent amounts of benzoin and $NH_2-(CH_2)_n-NH_2$, the other amino containing compounds are 2 to 1 on a proportionate mole basis.

The suitable manganese salts include the manganese (II) halides such as manganese (II) chloride (also known as manganous chloride) manganese (II) bromide, manganese (II) iodide, etc., as well as other manganese (II) compounds, such as manganese carbonate, manganese (II) oxalate, manganese (II) sulfate, manganese (II) nitrate, manganese (II) phosphates, etc., including hydrated forms thereof.

The chelate compounds may be formed by reacting substantially equal amounts of the manganese (II) salt and the imine in the presence of a suitable solvent such as a lower alkanol of 1 to 6 carbon atoms such as methanol. Higher stoichiometries may be employed such as 2 moles of alkanolimine per mole of manganese.

The imine can be formed from benzoin and amino containing compounds such as hydrazine, phenylhydrazine, methylamine, n-cyclohexylamine, β-hydroxyethylamine, ammonia and ethylene diamine.

The process in which the novel manganese based catalyst may be employed to catalyze the oxidative coupling of phenolic monomers may be carried out by combining the catalyst and monomer in an appropriate organic solvent in the presence of an oxygen containing gas and alkali. Generally, polymerizations may be carried out by combining the catalyst and monomer in an appropriate organic solvent in the presence of an oxygen containing gas. Generally, polymerizations may be carried out using a mole ratio of phenolic monomer to complexed manganese of from 100:1 to 300:1.

The preferred polymerization solvent is a mixture of a lower alkanol of 1 to 6 carbon atoms, i.e. methanol and an aromatic organic solvent such as toluene, benzene, chlorobenzene, xylene or styrene. The preferred reaction composition of a phenolic monomer, i.e., 2,6-xylenol, a lower alkanol, i.e. methanol, and an aromatic organic solvent is from 20:20:60 to 16:10:74 weight percent respectively. The exact ratios are not critical and may be varied depending on the particular catalyst employed.

The catalyst is dissolved in a lower alkanol such as methanol and is added to the phenolic monomer-organic solvent solution in a reactor that is equipped with an oxygen inlet tube and an appropriate stirring device. In order to increase the stability and reactivity of the catalyst, primary, secondary or tertiary amines such as n-hexylamine may be added to the reaction mixture according to the procedure described in U.S. Pat. No. 3,956,242, which is hereby incorporated by reference. Various amines are mentioned in U.S. Pat. Nos. 3,306,874 and 3,306,875. The amine may be added at a phenol to amine mole ratio within the range of from about 100:0.05 to about 100:15.

The polymerization is initiated by introducing a stream of oxygen at a rate that is sufficient to be in excess over that which is absorbed. Alakli is essential and is preferably added as a 50% aqueous solution of sodium hydroxide sufficient to maintain a mole ratio of 14:1 to 18:1 and more preferably about 16:1 of phenolic compound to hydroxyl ion during the polymerization. Other basic materials are described in U.S. Pat. No. 3,956,242. After initiation of the reaction, the temperature does not exceed substantially 45° C., preferably 35° C. When a polyphenylene oxide having an intrinsic viscosity of about 0.45 dl/g as measured in chloroform at 30° C. is obtained, the reaction may be terminated by adding to the reactor, sufficient aqueous acetic acid or aqueous sulfuric acid to neutralize the reaction media. After neutralization, the entire reaction mixture may be precipitated with a suitable solvent, e.g. methanol, and isolated according to standard techniques.

DESCRIPTION OF THE PREFERRED EMBODIMENTS

The following examples illustrate the process of the invention. They are merely illustrative, and are not to be construed to limit the invention in any manner whatsoever.

EXAMPLE I

An imine, benzoin anilinoimine, was prepared by combining benzoin (5.0 g., 0.0236 M) and phenylhydrazine (3.0 g., 0.0277 M) in methanol (140 ml.). On heating the mixture at 50° C. for about 1½ hours, the solution turned yellow.

After cooling and stirring overnight, the resulting solution was further diluted by adding additional methanol (about 60 ml.) to bring the volume to about 200 ml. To 72 ml. of that solution was added MnCl$_2$ (1.03 g.) and the resulting solution was agitated for one hour. The product formed is manganese benzoin anilino imine.

A polymerization reaction was carried out with the following materials:

| | |
|---|---|
| toluene | 378 ml. |
| 2,6-xylenol | 100 g. (.819 mole) |
| 50% aq. sodium hydroxide | 4.0 g. |
| benzoin anilino manganese | (the catalyst prepared above in MeOH) (.0082 mole) |

The above materials were charged in a 1 liter reactor equipped with a stirrer and an oxygen inlet tube. The resulting mixture was stirred and the oxygen flow initiated. After two hours the reaction was quenched by adding 10 ml. of 50% acetic acid and the polymer (2,6-dimethyl-1,4-phenylene oxide) was precipitated with methanol. The intrinsic viscosity of the product polymer is 0.56 dl/g.

What is claimed is:

1. A catalyst for the oxidative coupling of a phenolic monomer which comprises compounds of the formulae:

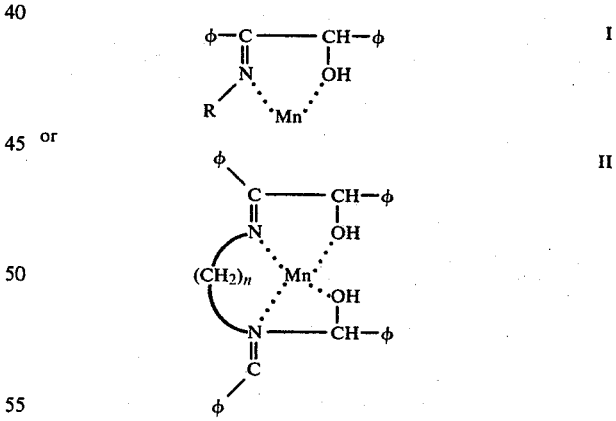

wherein R is selected from hydrogen, amino, anilino, alkyl, aminoalkyl and hydroxyalkyl, said alkyl group containing from 1 to 8 carbon atoms; and n is an integer from 2 to 3.

2. A catalyst as claimed in claim 1 having formula I wherein R is methyl.

3. A catalyst as claimed in claim 1 having formula I wherein R is n-hexyl.

4. A catalyst as claimed in claim 1 having formula I wherein R is anilino.

5. A catalyst as claimed in claim 1 having formula I wherein R is hydroxyethyl.

6. A catalyst as claimed in claim 1 having formula II wherein n is 2.

7. A method for the preparation of a polyphenylene oxide which comprises oxidatively coupling a phenolic monomer of the formula:

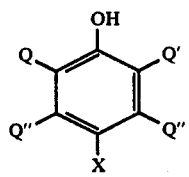

wherein X is substituent selected from the group consisting of hydrogen, chlorine, bromine and iodine; Q is a monovalent substituent selected from the group consisting of hydrocarbon radicals, halohydrocarbon radicals having at least two carbon atoms between the halogen atom and the phenol nucleus, hydrocarbonoxy and halohydrocarbonoxy radicals having at least two carbon atoms between the halogen atom and the phenol nucleus; and Q' is as defined for Q, and in addition may be halogen and Q'' are each as defined for Q' and in addition hydrogen with the proviso that Q, Q' and Q'' are all free of the tertiary carbon atom, in the presence of a catalyst having formula I or II as defined in claim 1, a solvent, a base and an oxygen containing gas under polymer forming conditions and thereafter recovering the polyphenylene oxide from the reaction mixture.

8. The method as claimed in claim 7 wherein the catalyst is of the formula I as defined in claim 1 wherein R is methyl.

9. The method as claimed in claim 7 wherein the catalyst is of the formula I as defined in claim 1 wherein R is n-hexyl.

10. The method as claimed in claim 7 wherein the catalyst is of the formula I as defined in claim 1 wherein R is anilino.

11. The method as claimed in claim 7 wherein the catalyst is of the formula I as defined in claim 1 wherein R is hydroxyethyl.

12. The method as claimed in claim 7 wherein the catalyst is of the formula II as defined in claim 1 wherein n is 2.

13. The method as claimed in claim 7 wherein the phenolic monomer is 2,6-xylenol.

* * * * *